United States Patent
Caldwell et al.

(10) Patent No.: US 9,538,381 B2
(45) Date of Patent: *Jan. 3, 2017

(54) SYSTEM AND METHOD FOR AUTHORIZING ACCESS TO AN IP-BASED WIRELESS TELECOMMUNICATIONS SERVICE

(71) Applicant: T-Mobile USA, Inc., Bellevue, WA (US)

(72) Inventors: Christopher E. Caldwell, Woodstock, GA (US); Janne P. Linkola, Espoo (FI)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,350

(22) Filed: Mar. 25, 2014

(65) Prior Publication Data
US 2014/0204840 A1    Jul. 24, 2014

Related U.S. Application Data

(63) Continuation of application No. 12/446,449, filed as application No. PCT/US2007/082144 on Oct. 22, 2007, now Pat. No. 8,681,692.
(Continued)

(51) Int. Cl.
*H04W 4/00* (2009.01)
*H04W 12/08* (2009.01)
*H04W 88/08* (2009.01)

(52) U.S. Cl.
CPC ............ *H04W 12/08* (2013.01); *H04W 88/08* (2013.01)

(58) Field of Classification Search
CPC .............................. H04W 12/08; H04W 88/08
(Continued)

(56) References Cited

U.S. PATENT DOCUMENTS 7,272,397 B2    9/2007    Gallagher et al.
7,283,822 B2    10/2007   Gallagher et al.
(Continued)

FOREIGN PATENT DOCUMENTS

EP          1643676        4/2006
WO     WO-2005086421       9/2005

OTHER PUBLICATIONS

International Search Report and Written Opinion: International Application No. PCT/US2007/82144, Filed Oct. 22, 2007, Applicant: T-Mobile USA, Inc., Date of Mailing: Mar. 17, 2008, 10 pages.
(Continued)

*Primary Examiner* — Faisal Choudhury
(74) *Attorney, Agent, or Firm* — Perkins Coie LLP

(57) ABSTRACT

A system for providing an IP-based wireless telecommunications device with access to an IP-based wireless telecommunications service provided by a carrier network includes an access point that sets up a radio link with the IP-based wireless telecommunications device and couples the IP-based wireless telecommunications device to the network. The system also includes a network controller in communication with the carrier network and the access point. The network controller is configured to receive data packets corresponding to the IP-based wireless telecommunications device at the access point. The network controller is also configured to accept/reject the provision of the IP-based wireless telecommunications service to the IP-based wireless telecommunications device based on an IP address or other unique identifier associated with the access point. In other examples, the system further includes a data store that associates IP addresses of access points (or other identifiers) with an indicator of a black or whitelisted status. Other features and systems are also disclosed.

18 Claims, 3 Drawing Sheets

Related U.S. Application Data

(60) Provisional application No. 60/853,150, filed on Oct. 20, 2006.

(58) Field of Classification Search
USPC .......................................................... 370/328
See application file for complete search history.

(56) References Cited

U.S. PATENT DOCUMENTS

| | | | |
|---|---|---|---|
| 7,349,698 B2 | 3/2008 | Gallagher et al. | |
| 7,369,859 B2 | 5/2008 | Gallagher | |
| 7,480,264 B1* | 1/2009 | Duo et al. | 370/310.2 |
| 7,716,740 B2* | 5/2010 | Robert et al. | 726/23 |
| 8,189,548 B2 | 5/2012 | Caldwell et al. | |
| 8,681,692 B2 | 3/2014 | Caldwell et al. | |
| 2004/0142699 A1* | 7/2004 | Jollota et al. | 455/452.2 |
| 2005/0026594 A1 | 2/2005 | Miller et al. | |
| 2005/0122926 A1* | 6/2005 | Cromer et al. | 370/311 |
| 2005/0176438 A1 | 8/2005 | Li | |
| 2005/0207395 A1 | 9/2005 | Mohammed | |
| 2005/0265279 A1 | 12/2005 | Markovic et al. | |
| 2005/0272449 A1* | 12/2005 | Gallagher | H04W 36/14 455/458 |
| 2006/0068811 A1* | 3/2006 | Adya et al. | 455/456.2 |
| 2006/0168006 A1 | 7/2006 | Shannon et al. | |
| 2006/0184680 A1 | 8/2006 | Ruutu et al. | |
| 2006/0211448 A1 | 9/2006 | Reiss et al. | |
| 2006/0223497 A1* | 10/2006 | Gallagher et al. | 455/410 |
| 2006/0223498 A1 | 10/2006 | Gallagher et al. | |
| 2006/0251051 A1 | 11/2006 | Bhatt et al. | |
| 2006/0268902 A1* | 11/2006 | Bonner | H04L 63/102 370/401 |
| 2006/0270411 A1* | 11/2006 | Grayson | H04W 36/14 455/444 |
| 2006/0282880 A1 | 12/2006 | Haverinen et al. | |
| 2007/0011268 A1 | 1/2007 | Banga et al. | |
| 2007/0149243 A1 | 6/2007 | Hwang et al. | |
| 2007/0256135 A1* | 11/2007 | Doradla et al. | 726/26 |
| 2007/0270152 A1* | 11/2007 | Nylander et al. | 455/445 |
| 2008/0089272 A1 | 4/2008 | Ahokangas | |
| 2008/0125120 A1 | 5/2008 | Gallagher et al. | |
| 2008/0305768 A1 | 12/2008 | Nylander et al. | |
| 2008/0305792 A1 | 12/2008 | Khetawat et al. | |
| 2008/0318571 A1* | 12/2008 | Vikberg et al. | 455/435.2 |
| 2009/0061879 A9* | 3/2009 | Gallagher et al. | 455/439 |
| 2009/0154426 A1* | 6/2009 | Perraud | H04W 36/26 370/332 |
| 2009/0177730 A1* | 7/2009 | Annamalai | H04W 4/02 709/202 |
| 2010/0041372 A1 | 2/2010 | Linkola et al. | |

OTHER PUBLICATIONS

"3rd Generation Partnership Project; Technical Specification Group Services and System Aspects; 3GPP system to Wireless Local Area Network (WLAN) Interworking; Functional and architectural definition (Release 6); 3GPP TR 23.934" ETSI Standards, European Telecommunications Standards Institute, Sophia-Antipo, FR, No. V1000, Aug. 2002 (Aug. 2002).

"Digital cellular telecommunications system (Phase 2+); Generic access to the A/Gb interface; Stage 2 (3GPP TS 43.318 version 6.6.0 Release 6); ETSI TS 143 318" ETSI Standards, European Telecommunications Standards Institute, Sophia-Antipo, FR, vol. 3-G1, No. V660, Apr. 2006 (Apr. 2006).

International Search Report and Written Opinion, International Application No. PCT/US2007/069189, Filed May 17, 2007, Applicant: T-Mobile USA, Inc., Date of Mailing: Nov. 16, 2007, 12 pages.

* cited by examiner

SYSTEM AND METHOD FOR AUTHORIZING ACCESS TO AN IP-BASED WIRELESS TELECOMMUNICATIONS SERVICE

CROSS-REFERENCE TO RELATED APPLICATION(S)

This application is a continuation of U.S. patent application Ser. No. 12/446,449, entitled SYSTEM AND METHOD FOR AUTHORIZING ACCESS TO AN IP-BASED WIRELESS TELECOMMUNICATIONS SERVICE, filed Jan. 25, 2011, now U.S. Pat. No. 8,681,692, which is a U.S. National Stage application of International Application No. PCT/US07/82144, entitled SYSTEM AND METHOD FOR AUTHORIZING ACCESS TO AN IP-BASED WIRELESS TELECOMMUNICATIONS SERVICE, filed Oct. 22, 2007, which claims priority to U.S. Provisional Patent Application No. 60/853,150, filed Oct. 20, 2006, each of which are hereby incorporated by reference.

BACKGROUND

In this digital age, modern telecommunication service providers and device manufacturers are increasingly relying on public and/or private IP networks, including the Internet, as a core part of their technology. For example, many telecommunications service providers now offer a suite of Voice over IP ("VoIP") services, as well as various data services, that utilize IP networks and/or IP-based wireless access networks (e.g., access networks based on IEEE 802.16 ("WiMAX"), IEEE 802.20 Mobile Broadband Wireless Access (MBWA), Ultra Wideband (UWB), 802.11 wireless fidelity ("Wi-Fi"), Bluetooth, and similar standards) for at least part of their infrastructure. Likewise, device manufacturers are producing the next generation of mobile devices (e.g. wireless handhelds, wireless handsets, mobile phones, personal digital assistances, notebook computers, and similar devices) that are enabled to send and receive information utilizing IP-based telecommunications services. In fact, many of today's modern mobile devices are able to function as "dual-mode devices" that take advantage of both cellular network technologies and IP-based technologies.

Unlicensed Mobile Access (UMA) technology has developed as part of this trend to incorporate IP solutions into mobile device telecommunication systems. UMA technology has recently been accepted into Release 6 of the 3rd Generation Partnership Project (3GPP) and is also referred to as Generic Access Network (GAN) technology. In various implementation schemes, UMA allows wireless service providers to merge cellular networks, such as Global System for Mobile Communications (GSM) networks and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, much like they can transparently move between cells within the cellular network. Seamless in-call handover between the IP-based wireless network and the cellular network ensures that the user's location and mobility do not affect the services delivered to the user.

At an operational level, UMA technology effectively creates a parallel radio access network, the UMA network, which interfaces to the mobile core network using standard mobility-enabled interfaces. For example, UMA can replace a system's GSM radio technology on the lower protocol layers with a wireless LAN or similar technology. A call or other communication may be tunneled to the Mobile Switching Center (MSC) of a mobile service provider via an access point (e.g., a WiFi access point connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

As the availability of IP-based wireless telecommunications solutions expand, wireless service providers and wireless users may face various obstacles. For example, users may experience inconsistent or no service due to data congestion at access points serving the user's IP-based wireless telecommunications handset. For example, IP-based wireless telecommunications providers may wish to reject service via certain access point serving the providers' customers when such access points are associated with fraudulent activities.

DETAILED DESCRIPTION

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. SAMPLE NETWORK CONFIGURATIONS

Figure 1:
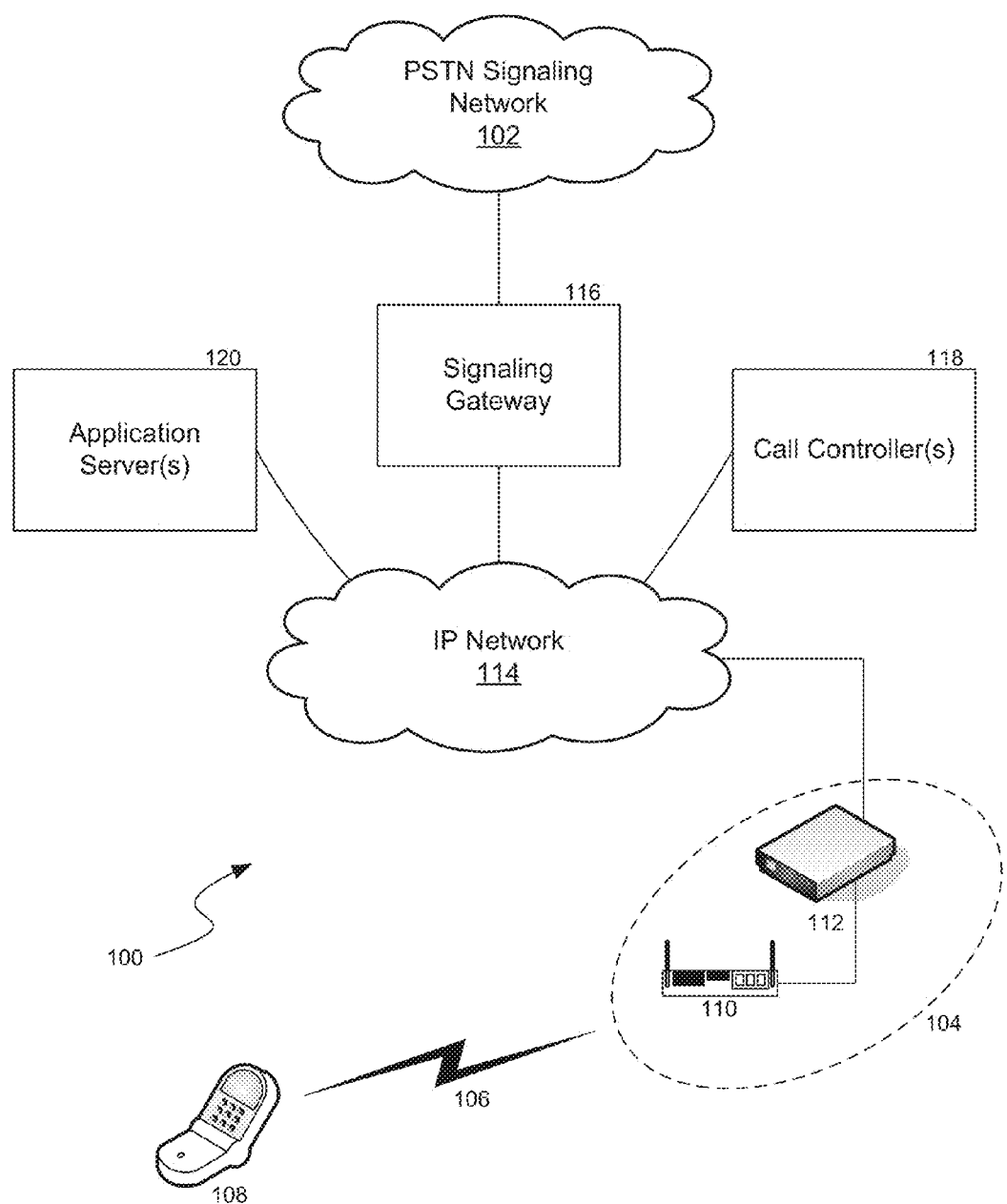
FIG. 1 illustrates aspects of a sample network system that allows VoIP-based communications in conjunction with a public switched telephone network (PSTN).
Figure 2:
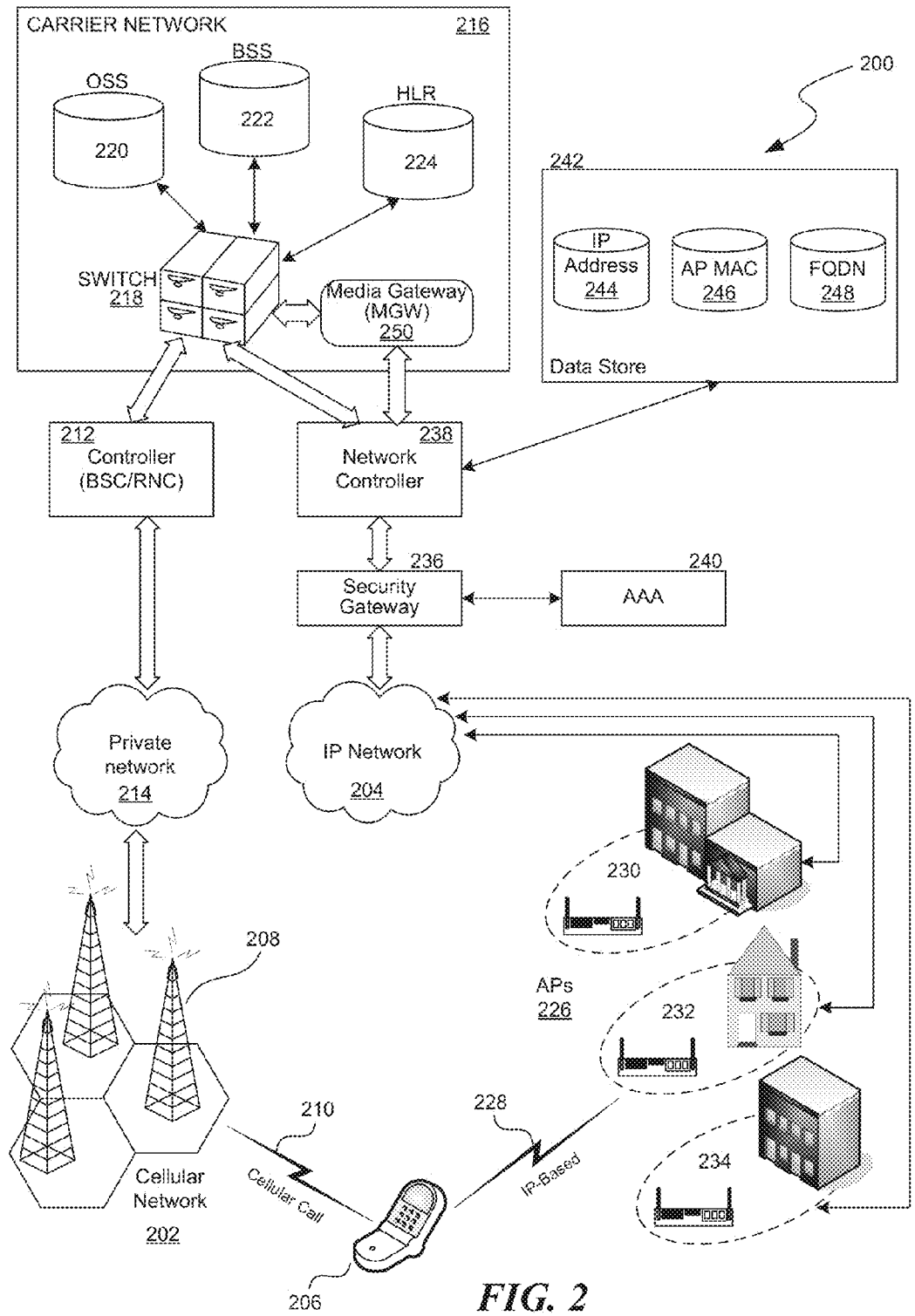
FIG. 2 illustrates an example converged wireless network system that combines a cellular network with an IP-based wireless telecommunications network.

FIGS. 1 and 2 show sample network system configurations in which aspects of IP-based wireless telecommunications service (e.g. an unlicensed mobile access (UMA) service) can be implemented in accordance with various embodiments. In general, IP-based wireless telecommunications service authorization can be carried out at a network controller of the network system, for example, by identifying an IP address associated with an access point and basing access to the service on such an IP address.

FIG. 1 illustrates aspects of a sample network system 100 that allows VoIP-based communications in conjunction with a public switched telephone network (PSTN) 102. The system 100 includes at least one wireless access point 104. The access point 104 may be public or private, and may be located, for example, in a subscriber's residence (e.g., home, apartment or other residence), in a public location (e.g., coffee shops, retail stores, libraries, or schools) or in corporate or other private locations. In the sample system of FIG. 1, the access point 104 can accept communications 106 from at least one suitably configured mobile device 108 (e.g., a VoIP device). Various types of network technology may be involved in communicating between the mobile device 108 and the access point 104. While "WiFi" is used herein as an example, mobile devices and access points may employ any type of non-cellular wireless protocol, including wireless local, wide, and metropolitan area network (WLAN, WWAN, WMAN, respectively) access protocols. For example, wireless protocols can include IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards. The access point 104 can include a wireless router 110 and a broadband modem 112 that enable connection to an Internet Protocol (IP) network 114. The IP network 114 may comprise one or more public networks, private networks, or combination of public and private networks.

In a communication or set of communications 106, the access point 104 receives IP packets from the mobile device 108. These IP packets are then transported through the IP network 114 to a signaling gateway 116, which in the example of FIG. 1, is operated by a telecommunications service provider. At the signaling gateway 116, the IP packets are converted to a traditional phone service signal. The phone service signal is then conveyed to a recipient via the PSTN 102.

The network system 100 of FIG. 1 also includes a call controller 118 that provides call logic and call control functions for communications sent through the system and an application server 120 that provides logic and execution of one or more applications or services offered by the telecommunications service provider, such as applications that implement various access and security rules. In some embodiments, aspects of UMA service authorization can be implemented at the call controller 118 and/or application server 120 (described in more detail below with reference to FIG. 4). In this example, a telecommunication service provider manages both the call controller 118 and the application server 120.

FIG. 2 illustrates a sample network system 200 in which aspects of UMA service authorization can be implemented within a cellular telephone-type network. In general, with respect to the network system described in FIG. 2, because the same cellular protocols are used in communications involving IP access points as with traditional radio towers, the cellular service provider maintains a large degree of system compatibility even though using an IP-based network. For example, the various systems of the cellular service provider that deliver content and handle mobility may not even need to be aware that a subscriber's mobile device is on an IP-based wireless telecommunications network. Instead, the various systems of the cellular service provider assume the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed and/or unlicensed spectrum access—such as spectrums for IP-based wireless telecommunications). Likewise, at a protocol level, because the same cellular protocols are used in communications involving the IP access points as with traditional radio towers, the cellular service provider maintains a large degree of system compatibility even though using an IP-based network.

Referring to FIG. 2, a sample network system 200 combines a cellular telephone network 202 (such as a GSM network) and an IP network 204 in a UMA-type configuration that provides service to the user of a mobile device 206. Such service may include voice services, and also supplementary services like call forwarding and call waiting, text messaging services (e.g., SMS), and data-based services like ring tone downloads, game downloads, picture messaging, email and web browsing. Further, since the mobile device 206 is connected to an IP network, all manner of data services available over such networks may be provided to the mobile device 206.

In general, the described network system 200 accepts registration requests and communication connections from the mobile device 206. The accepted registration requests can be requests to either the cellular telephone network 202 or to the IP-based network 204. Accordingly, to handle requests to the cellular telephone network 202, the cellular telephone network 202 includes one or more cell towers 208 that are configured to accept cellular communications 210 from the mobile device 206. The cell towers 208 are connected to a base station controller 212 (such as a base station controller/radio network controller (BSC/RNC)) via a private network 214. The private network 214 can include a variety of connections (not shown) such as T1 lines, a wide area network (WAN), a local area network (LAN), various network switches, and other similar components.

The base station controller 212 controls communication traffic to a carrier core network 216, where all communications are managed (including both cellular and IP-based). Components of the carrier core network 216 in this example include a switch (e.g., a mobile switching center or MSC)) 218, which is configured to control data/call flows and perform load balancing, as well as other functions. The carrier core network 216 may also include a variety of system databases such as an operation support subsystem (OSS) database 220, a business support system (BSS) database 222, and home location register (HLR) 224 or other central subscriber database that contains details of a carrier's subscribers for billing, call logging, etc.

The sample network system 200 of FIG. 2 further includes one or more access points 226 that can accept IP-based communications 228 from the mobile device 206. For example, each access point 226 can be configured as part of a wireless network in one or more locations such as a public network 230, a home network 232, or a private business network 234. Each access point 226 is coupled to the IP network 204 through, for example, a broadband connection (not shown) such as a DSL (Digital Subscriber Line) modem, a cable modem, a satellite modem, or any other broadband device.

When the mobile device 206 attempts to access the IP network 204 (i.e., to initiate an IP-based communication), information (e.g., data, voice, SMS, etc.) is initially formatted in the cellular system's 202 native protocol and then encapsulated into Internet Protocol (IP) packets, which are transmitted to the access point 226 and routed through the IP network 204 to a security gateway 236. In contrast to non-IP communication requests, such transmissions bypass the cellular telephone system's 202 existing network of radio towers. The security gateway 236 controls access to a network controller 238, which communicates with a data store 240 for logging and accessing communications data. Thus, one function of the network controller 238 is to manage access to the carrier network 216 when dealing with an IP-based communication (in a similar manner to that performed by the base station controller 212 for a non-IP-based communication).

In one example, authentication of a request for access by the mobile device 206 over the IP network 204 is handled by the security gateway 236, which communicates with an authentication, access and authorization (AAA) module 240 that is most likely associated with the carrier network 216. Challenges and responses to requests for access by the mobile device 206 are communicated between the HLR 224 and the AAA module 240. When authorization is granted, the security gateway 236 communicates the assignment of an IP address to the mobile device 206 that requested access. Once the security gateway 236 passes the IP address to the mobile device 206, the public IP address assigned to the mobile device 206 is passed to the network controller 238.

In an additional or alternative authorization example, upon receiving an identifier from the mobile device 206, the network controller 238 may query the data store 242 to determine if the mobile device 206 is authorized for accessing the IP network 204. Sample identifiers that may be utilized to determine access include a media access control (MAC) address associated with an access point, a mobile device or subscriber identifier (such as an International Mobile Subscriber Identifier (IMSI)), an Internet Protocol (IP) address (or "Public IP address") associated with the access point, a fully qualified domain name (FQDN), or other similar types of information. The data store 242 may be a single database, table, or list, or a combination of databases, tables, or lists, such as one for IP addresses 244, one of MAC addresses 246, and one for FQDNs 248.

In a representative embodiment, the data store 242 includes identifiers of "rejected" or "blacklisted" access points as well as "authorized" or "whitelisted" access points. Accordingly, the network controller 238 may authorize access to the IP-based wireless telecommunications network by using an authorized session table or similar data construct, including such that associates IP, MAC, or other identifiers with accepted/rejected access points. For example, the network controller 238 may authorize UMA service after an authorization granted by the AAA module 240 and verification that the access point is not blacklisted. Alternatively, the network controller 238 may handle such verification and additionally carry out generally similar operations to those of the AAA module 240, but instead doing so using the data store 242.

In some cases, the signaling portion of a communication (e.g., the portion of the communication that governs various overhead aspects of the communication such as, for example, when the call starts, when the call stops, initiating a telephone ring, etc.) is routed through the network controller 238 to the switch 218, while the voice bearer portion of the communication (e.g., the portion of the communication that contains the actual content (either data or voice information) of the communication) is routed through the network controller 238 to a media gateway 250. In other words, the media gateway 250 controls the content flow between the service provider and the mobile device 206, while the switch 218 controls the signaling flow (or controls overhead-related flow) between the service provider and the mobile device 216.

II. IP-BASED WIRELESS TELECOMMUNICATIONS SERVICE AUTHORIZATION

Conventional methods of allowing access to a carrier network do not generally consider the identity of individual access points and therefore do not base the authorization of IP-based wireless telecommunications services on such a consideration. Although in several instances access points provide IP-based wireless telecommunications services to wireless devices at individual access points without any difficulty or problems, some access points may provide less than optimal communication with a carrier network. For example, some access points may have a poor quality of service (at least temporarily). Accordingly, in such an instance it would be preferable to prevent mobile devices from receiving such poor quality of service by blocking IP-based wireless telecommunications services at such access points. Alternatively, some access points may have a history of fraud related activity. Blocking IP-based wireless telecommunications services at these access points could prevent further fraud.

A. Access Point Based Network Access Control

Since the networks associated with IP-based wireless telecommunications services are potentially shared among many different services, connection quality may be carefully monitored. For example, a poor user experience may result when an Internet connection is overtaxed. This can be affected by multiple subscribers and other Internet connected equipment using the same Internet connection at an access point. An IP-based wireless telecommunications network perceives all network usage using the same Internet connection as coming from a single IP address. In some example systems, IP-based telecommunications-enabled mobile devices are used on private networks that host a numbers of devices such as computers, PDAs, and other devices. These private networks share a single Internet connection. To the IP-based wireless telecommunications network, this usage appears to originate from a single IP address. According to one embodiment, the IP-based wireless telecommunications network is configured to monitor the communication quality and numbers of IP-based wireless telecommunications devices according to their IP address. In additional or alternative embodiments, the IP-based wireless telecommunications network is also configured to determine if communication quality problems are the result of a single access point in the network, multiple access points in the network, or by an overall Internet connectivity problem. For example, the IP-based wireless telecommunications network can be configured to simultaneously track connections that are associated with a specific IP address for quality issues (e.g. the IP address of an access point). These connections can include either active communications or communications that are in their idle mode. When quality issues are identified with the connection associated with a specific IP address, the IP-based wireless telecommunications network is arranged to determine if the quality issues are the result of general Internet congestion or by a single access point in the local network.

In general, current Wi-Fi access points are limited to a fixed number of simultaneous connections due to the nature of the 802.11 communication protocols. The monitored connections from the access point to the mobile subscriber can be either an active communication or an idle communication. The access point limit for simultaneously active communications may be low (e.g., as low as six subscribers in a conventional access point) due to MAC layer protocols and the RF layer of the access point. Moreover, the access point may also be limited in its capability to handle a large number of packets that are generated by simultaneous active communications, which can result in a data traffic jam. In several embodiments, the IP-based wireless telecommunications network is configured to monitor the number of simultaneous active and/or idle communications that are connected through a selected access point.

Accordingly, a network based solution described herein prevents IP-based wireless telecommunications service at an individual access point such that undesirable user experiences related to quality of service issues such as these and others are minimized. For example, a variety of quality of service metrics associated with the access point can be monitored, including the number of users that are connected to the access point. In some embodiments, the novel network solution use methods described in PCT application number PCT/US2006/049341, entitled SYSTEM AND METHOD FOR LIMITING ACCESS TO AN IP-BASED WIRELESS TELECOMMUNICATION NETWORK BASED ON ACCESS POINT IP ADDRESS AND/OR MAC ADDRESS, incorporated herein by reference, and/or the previously-referenced U.S. Provisional Application No. 60/853,150. Accordingly, the IP-based wireless communication network can accept/reject authorization of IP-based wireless telecommunications service based on this type of metric and others, such as those that prevent IP-based wireless telecommunications service based on one or more types of surreptitious activity or fraud that may have occurred at an access point. For example, a service provider may not have received any type of service payment from a deployer of the access point. Accordingly, the service provider could prevent wireless access until such a payment is received.

In several embodiments, the network based solution may include actively blacklisting access points when they fail to meet one or more metrics. Additionally or alternatively, the network-based solution may also include actively whitelisting access points when they satisfy one or more metrics. In these and other embodiments, the network based solution may provide a message or indicator to an access point or a mobile device at such an access point, indicating the status of an access point (e.g., whether the access point is black or white listed). Still further, the network based solution may also include providing a warning or other type of indicator to such an access point or mobile device that the access point is about to become blacklisted. For example, a user of an access point may be unaware that there is too much communication traffic at the access point (affecting a quality of service). Such a warning or indication would allow the user to correct the problem before an access point is blacklisted.

B. IP-Based Telecommunications Service Authorization at the Network Controller

Figure 3:
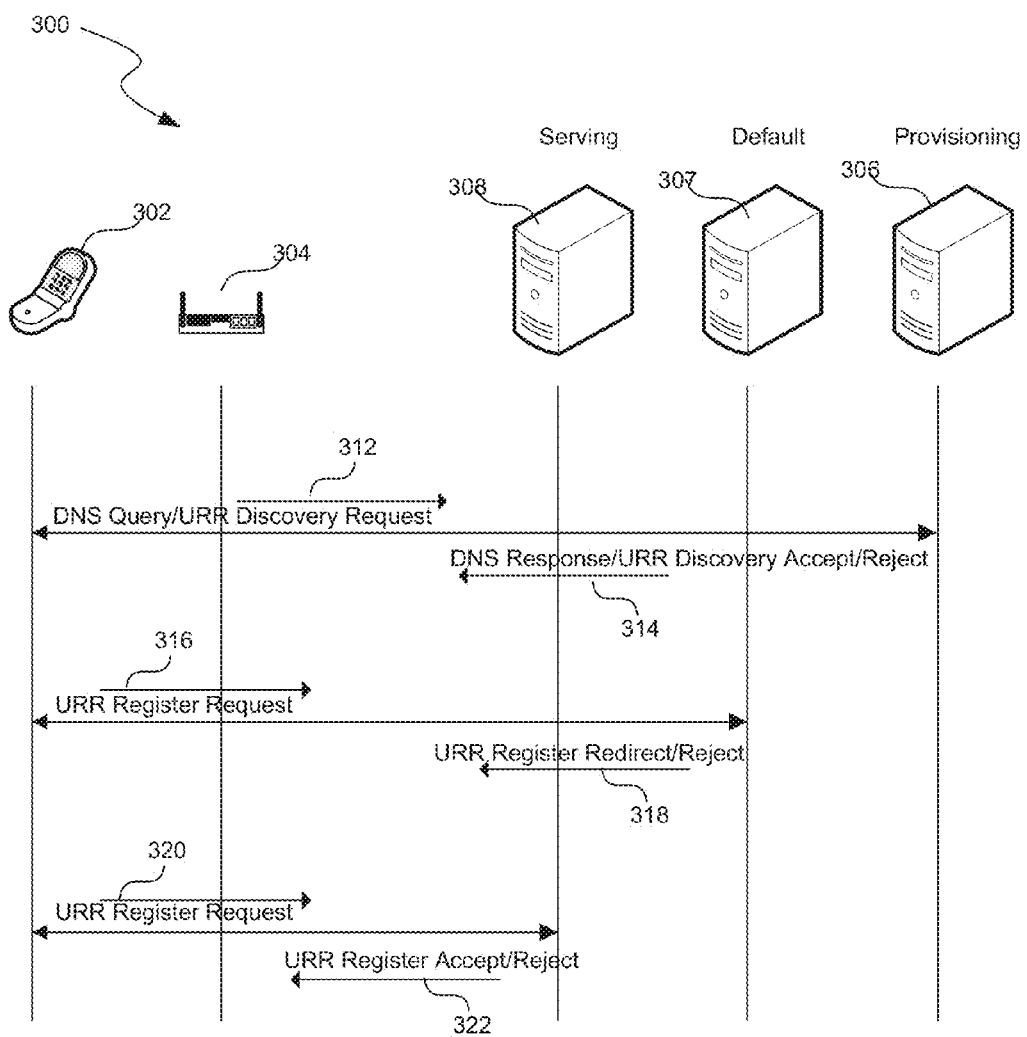
FIG. 3 is a communication diagram illustrating an example of communications between a mobile device and one or more network controllers, the communications including an IP address or other type of identifier corresponding to an access point and authorizing/rejecting the provision of IP-based wireless telecommunications service to the mobile device.

FIG. 3 a communication diagram 300 that illustrates a process of authorizing the provision of IP-based wireless telecommunications service at a network controller. More specifically, FIG. 3 shows a mobile device 302, an access point 304 in communication with the mobile device 302, and network controllers 306-308 in communication with the access point 302. The network controller 306 may carry out provisioning of an IP-based wireless telecommunications service to an appropriate network controller. For example, the mobile device 302 may not initially be associated with a serving network controller. The provisioning network controller 306 can accordingly direct communications to an appropriate default network controller or serving network controller. On the other hand, the mobile device 302 may be first associated with the default network controller 307, but the default network controller 307 may direct communications to the serving network controller depending on which server is better suited to provide the IP-based wireless telecommunications service. Alternatively, the default network controller 307 could in some instances provide the service, essentially functioning as a serving network controller.

Call connections are monitored with any of the network controllers 306-308 to determine a status associated with the access point 304. For example, the communication quality or any type of fraud could be reported to the data store 242 (FIG. 2). Accordingly, when the mobile device 302 attempts to set up service via one of the network servers 306-308, service may be rejected based on a blacklisted status of the access point 304 at the data store 242. For example, after setting up a secure tunnel with the provisioning server 306, the mobile device 302 may communicate an IP address (or other identifier such as a MAC address) of the access point in a URR discovery request 312. In response, the provisioning server 306 may reject IP-based wireless telecommunications service in a URR discovery response 314. In another example, IP-based wireless telecommunications service may be similarly accepted or rejected using URR register requests 316 and responses 318 between the mobile device 302 and the default network server 307. In yet another example, IP-based wireless telecommunications service may also be accepted or rejected using URR register requests 320 and responses 322 between the mobile device 302 and the serving network controller 308.

In many embodiments, the network controller can be configured to monitor multiple mobile devices that originate from the same IP address, or from the same access point MAC address. Call quality can be monitored by the network controller by evaluating a downlink quality indicator on the signaling and the uplink quality at the media gateway. The network controller can also communicate a message back to a mobile device indicating that there is communication quality problem or that IP-based wireless telecommunications service is temporarily unavailable. When the communication quality improves, the network controller can restore service provided to at an access point. For example, the network controller may communicate with the data store 242, changing an access point from blacklisted to whitelisted status. Alternatively, other components coupled with the data store 242 (including those in communication with the IP network 204 or the carrier network 216) may update or change the status of a particular access point.

III. CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A system for providing IP-based wireless telecommunications service to at least one IP-based wireless telecommunications device, the system comprising:
   a carrier network; and
   at least one network controller in communication with the carrier network and at least one access point, the network controller being configured to:
   receive data packets corresponding to the IP-based wireless telecommunications device at the access point, and
   accept or reject a provision of the IP-based wireless telecommunications service to the IP-based wireless telecommunications device based on an identifier corresponding to the access point and located within one or more of the data packets,
   wherein reasons to accept or reject the provision of the IP-based wireless telecommunications service include a download or upload link quality of the access point that was previously reported to a data store associated with the network controller.

2. The system of claim 1 wherein the identifier is an IP address of the access point.

3. The system of claim 1 wherein the network controller is also in communication with a database, the database associating the identifier of the access point with at least one condition that identifies whether the network controller is to provide the IP-based wireless telecommunications service to the mobile device.

4. The system of claim 1 wherein the reasons to accept or reject the provision of the IP-based wireless-telecommunications service include a number of IP-based wireless telecommunications devices in communication with the access point, download or upload link quality of the access point, and fraudulent activity at the access point.

5. The system of claim 1 wherein the IP-based wireless telecommunications service includes an unlicensed mobile access (UMA) service.

6. A computer implemented method, comprising:
   receiving, by a network controller in communication with an access point, at least one data packet originating from an IP-based wireless telecommunications device and communicated along a communication path that includes the access point, wherein the mobile device is a dual-mode device that can provide voice communication over both a licensed network and an unlicensed IP-based network;

identifying, by the network controller, at least one of a MAC address and an IP address associated with the access point; and rejecting, by the network controller, a provision of an IP-based wireless telecommunications service to the IP-based wireless telecommunications device based on the identified MAC address/IP address, wherein reasons for rejecting the provision of the IP-based wireless telecommunications service are related to download or upload link quality of the access point previously reported to a data store of the IP-based wireless telecommunications service.

7. The method of claim 6 wherein the IP-based wireless telecommunications service is an unlicensed mobile access (UMA) service.

8. The method of claim 6 wherein the method is implemented at a network controller in communication with the access point via a computer network.

9. The method of claim 6 wherein the method is implemented at a network controller associated with a wireless service provider.

10. The method of claim 6, further comprising using the MAC address/IP address to perform a lookup operation in a database regarding one or more access points.

11. At least one non-transitory computer-readable medium carrying a computer program performing a method of providing unlicensed mobile access (UMA) service to at least one wireless mobile device, the method comprising:

identifying, by a network controller in communication with an access point, at least one of a MAC address and an IP address associated with the access point; and rejecting, by the network controller, a provision of an unlicensed mobile access (UMA) service to a mobile device in communication with the access point based on the identified MAC address/IP address, wherein reasons for rejecting the provision of the unlicensed UMA service are related to a monitored download or upload link quality of the access point previously reported to a data store associated with the network controller.

12. The at least one non-transitory computer-readable medium of claim 11, wherein the method is implemented at a network controller in communication with the access point via a computer network.

13. The at least one non-transitory computer-readable medium of claim 11, the method further comprising using the MAC address/IP address to perform a lookup operation in a database regarding one or more access points.

14. A method for managing access to an IP-based wireless telecommunications service, the method comprising:

receiving data packets from an access point having a whitelist status in communication with a computer network;

blacklisting, by an network controller associated with the access point, the access point based on an identifier corresponding to the access point, wherein reasons for blacklisting the access point are related to a monitored download or upload link quality of the access point previously reported to a data store associated with the network controller; and communicating, by the network controller, an indicator that the access point is about to be blacklisted, wherein the indicator is communicated to an individual access point or to a mobile device at the individual access point.

15. The method of claim 14 wherein blacklisting the access point includes evaluating a performance metric corresponding to the individual access point or determining whether there is fraud or surreptitious activity at the access point.

16. The method of claim 14, further comprising removing a blacklist status or restoring a whitelist status of the individual access point based on the identifier corresponding to the access point.

17. The method of claim 14 wherein the identifier corresponding to the access point includes at least one of an IP address and a MAC address.

18. The method of claim 14 wherein the IP-based telecommunications service includes an unlicensed mobile access (UMA) service.

* * * * *